(12) United States Patent
Lu et al.

(10) Patent No.: US 7,809,399 B2
(45) Date of Patent: Oct. 5, 2010

(54) METHOD AND DEVICE FOR PROVIDING MULTIPLE COMMUNICATION PROTOCOLS WITH A SINGLE TRANSCEIVER

(75) Inventors: Kan Lu, Irvine, CA (US); Chongjun Jiang, Aliso Viejo, CA (US); Michael Chen, Irvine, CA (US); Bin Xu, Beijing (CN); Yiyan Tang, Irvine, CA (US); Huiyong Hong, Beijing (CN); Shuangli Wu, Beijing (CN); Feng Wu, Beijing (CN)

(73) Assignee: Syntek International Holding Ltd., Grand Cayman (KY)

( * ) Notice: Subject to any disclaimer, the term of this patent is extended or adjusted under 35 U.S.C. 154(b) by 875 days.

(21) Appl. No.: 11/702,278

(22) Filed: Feb. 6, 2007

(65) Prior Publication Data

US 2007/0197256 A1    Aug. 23, 2007

Related U.S. Application Data (60) Provisional application No. 60/772,062, filed on Feb. 10, 2006, provisional application No. 60/843,174, filed on Sep. 11, 2006.

(30) Foreign Application Priority Data

Sep. 22, 2006    (CN)    .............. PCT/CN2006/002486

(51) Int. Cl.
  *H04Q 7/20*    (2006.01)
(52) U.S. Cl. .............. 455/550.1; 455/552.1; 455/553.1; 455/426.1; 455/426.2; 455/41.1; 370/328; 370/329; 370/338; 370/343; 370/337
(58) Field of Classification Search ... 455/550.1–553.1, 455/426.1, 426.2, 445, 67.11, 412.1, 412.2, 455/414.1–414.4, 422.1, 403; 370/328, 329, 370/330, 337, 350, 347, 343, 508–514
See application file for complete search history.

(56) References Cited

U.S. PATENT DOCUMENTS

| 5,170,413 A | 12/1992 | Hess et al. |
| 5,406,629 A | 4/1995 | Harrison et al. |

(Continued)

FOREIGN PATENT DOCUMENTS

| CN | 1358003 A | 7/2002 |

(Continued)

OTHER PUBLICATIONS

PCT, The International Search Report And The Written Opinion Of The International Searching Authority, Jul. 5, 2007.

(Continued)

*Primary Examiner*—Keith T Ferguson
(74) *Attorney, Agent, or Firm*—Eastwind Consultants Company L; Jenny Chen; Laurence Kao (57) ABSTRACT

A wireless communication device and the method thereof are disclosed. The wireless communication device in accordance with the present invention includes an integrated protocol layer supporting a first communication protocol and a second communication protocol; a single transceiver operative to transmit and receive signals of said first and said second communication protocols.

60 Claims, 4 Drawing Sheets

U.S. PATENT DOCUMENTS

| | | |
|---|---|---|
| 5,412,352 A | 5/1995 | Graham |
| 7,039,358 B1 * | 5/2006 | Shellhammer et al. ..... 455/41.2 |
| 7,046,649 B2 | 5/2006 | Awater et al. |
| 7,126,937 B2 * | 10/2006 | Crosbie et al. .............. 370/350 |
| 7,215,659 B1 * | 5/2007 | Chen et al. .................. 370/338 |
| 2003/0036354 A1 | 2/2003 | Lee et al. |
| 2003/0036416 A1 | 2/2003 | Pattabiraman et al. |
| 2003/0139136 A1 | 7/2003 | Pattabiraman |
| 2003/0144029 A1 | 7/2003 | Wu et al. |
| 2004/0054798 A1 * | 3/2004 | Frank et al. ................. 709/229 |
| 2004/0240402 A1 * | 12/2004 | Stephens .................... 370/310 |
| 2005/0164637 A1 | 7/2005 | Pattabiraman et al. |
| 2005/0170776 A1 * | 8/2005 | Siorpaes |
| 2005/0192048 A1 | 9/2005 | Bridgelall |
| 2005/0255877 A1 | 11/2005 | Fuccello et al. |
| 2006/0030265 A1 | 2/2006 | Desai et al. |
| 2006/0030266 A1 | 2/2006 | Desai et al. |
| 2006/0211372 A1 | 9/2006 | Shellhammer et al. |
| 2006/0252418 A1 * | 11/2006 | Quinn et al. ................. 455/423 |

FOREIGN PATENT DOCUMENTS

| | | |
|---|---|---|
| CN | 1366757 A | 8/2002 |
| CN | 1568579 A | 1/2005 |
| CN | 1623319 A | 6/2005 |
| CN | 1640075 A | 7/2005 |
| CN | 1655548 A | 8/2005 |
| CN | 1659827 A | 8/2005 |
| CN | 1731693 A | 2/2006 |

OTHER PUBLICATIONS

Bluetooth and IEEE 802.11b/g Co-existence Solutions Overview, May 2005, pp. 1-57, Cambridge Silicon Radio Limited, Cambridge UK.

* cited by examiner

BT: the transceiver works as Bluetooth transceiver
WLAN: the transceiver works as a WLAN transceiver

FIG. 3

BT: the transceiver works as Bluetooth transceiver
WLAN: the transceiver works as a WLAN transceiver

FIG. 4

BT: the transceiver works as Bluetooth transceiver
WLAN: the transceiver works as a WLAN transceiver

FIG. 5

SCO: the transceiver works as Bluetooth transceiver with SCO link
ACL: the transceiver works as Bluetooth transceiver with ACL link
WLAN: the transceiver works as a WLAN transceiver

METHOD AND DEVICE FOR PROVIDING MULTIPLE COMMUNICATION PROTOCOLS WITH A SINGLE TRANSCEIVER

CROSS-REFERENCE TO RELATED APPLICATIONS

This application is related to and claims priority to U.S. provisional patent application, U.S. Provisional Application No. 60/772,062, filed Feb. 10, 2006, by the applicant Kan Lu et al., entitled "Method and Device For Providing Bluetooth And WLAN Communication Protocols Simultaneously With A Single Transceiver On Wireless Device"; U.S. provisional patent application, U.S. Provisional Application No. 60/843,174, filed Sep. 11, 2006, by the applicant Kan Lu et al., entitled "Method and Device For Providing Bluetooth And WLAN Communication Protocols With A Single Transceiver"; and PCT patent application, Application Number PCT/CN2006/002486, filed Sep. 22, 2006.

FIELD OF THE INVENTION

The present invention relates to communication systems; more particularly, the present invention relates to a method and device providing multiple communication protocols such as Bluetooth and Wireless LAN (WLAN) with a single transceiver.

BACKGROUND OF THE INVENTION

In today's busy world, more and more users desire to have multiple protocols such as both Bluetooth and WLAN wireless connections on their devices, esp. mobile devices, and wish to use these connections at the same time, at the same location, and in the same communication link between wireless devices. In cases of mobile devices, there are always power consumption, cost and size concerns for devices to support and operate on these connections simultaneously. Thus, there is a need for a simplified cost-down device which provides multiple communication protocols connections at the same time, at the same location, and in the same communication link, while only consuming minimized amount of power.

For example, one of such protocols, Bluetooth, is a short-range wireless technology intended to replace the cables connecting portable and/or fixed electronic devices. The key features of Bluetooth wireless technology are robustness, low power, and low cost. Many features of the core specification are optional, allowing product differentiation. A common Bluetooth system is a hands-free headset for use with mobile phones.

Another such protocols, wireless local area network (WLAN), is a widely used local area network technology that uses high-frequency radio waves rather than cables and wires to communicate between computers, peripherals, storage, and networking devices. Most WLAN devices support WLAN standards including IEEE802.11a, IEEE802.11b and/or IEEE802.11g. A common WLAN system is a WLAN network adapter used on notebook computers.

One solution to reducing power consumption, cost and size is to employ only a single transceiver for multiple communication protocols. However, when both Bluetooth and WLAN operate simultaneously, interference could occur. Thus, without reducing the interference to a tolerable level, it is hard to provide quality transmission. Additionally, since IEEE802.11b and IEEE802.11g and Bluetooth operate in an overlapped frequency band, providing both connections simultaneously from a user's perspective is also a must from a user's point of view.

Therefore, it is desired to have a wireless communication device supporting communication protocols, such as Bluetooth and WLAN transmissions, at the same time, while reducing the interference created during transmission; as a result, the quality transmission of both communication links is not compromised. It is also desired to minimize the power consumption, size and cost for such a device.

SUMMARY OF THE INVENTION

It is an object of the present invention to provide a wireless communication device supporting multiple communication protocols, such as WLAN and Bluetooth communication protocols, while at the same time reducing the interference generated therebetween. In one embodiment, the device utilizes only one single transceiver.

It is another object of the present invention to provide a wireless communicating method supporting multiple communication protocols, such as WLAN and Bluetooth communication protocols, while at the same time reducing the interference generated therebetween. In one embodiment, the method utilizes only one single transceiver.

It is yet another object of the present invention to provide a single transceiver supporting multiple communication protocols, such as WLAN and Bluetooth, while at the same time reducing the interference generated therebetween.

Other objects of the present invention can be readily ascertained by one of ordinary skilled in the arts upon review of the detailed descriptions of the preferred embodiments.

DETAILED DESCRIPTION OF THE EMBODIMENTS

Reference will now be made in detail to the embodiments of the present invention. Examples of embodiments are illustrated in the accompanying drawings, wherein like reference numbers refer to like elements throughout the specification.

Figure 1:
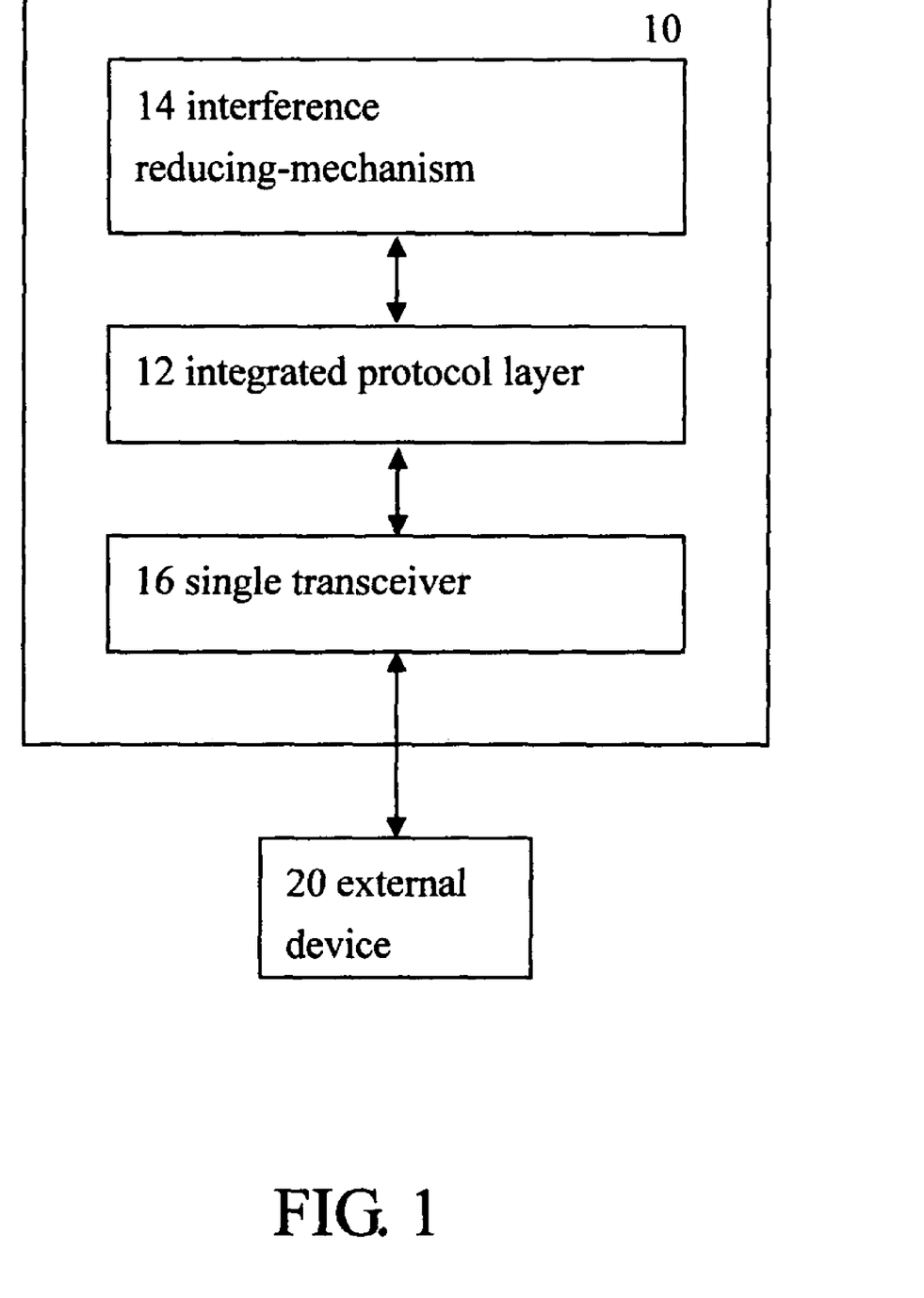
FIG. 1 shows a block diagram of a wireless communication device in accordance with the present invention.

FIG. 1 illustrates a block diagram of a wireless communication device 10 in accordance with the present invention. The wireless communication device 10 of the present invention allows packets of two or more different communication protocols to be transmitted and received utilizing one single transceiver. In one embodiment of the present invention, the wireless communication device 10 may be a personal computer incorporating multiple communication protocols such as Bluetooth and WLAN technologies. However, the wireless communication device 10 of the present invention may also be other electronic device supporting both of these protocols or other protocols.

As can be seen in FIG. 1, the wireless communication device 10 of the present invention may include an integrated protocol layer 12, a single transceiver 14 and an interference-reducing mechanism 16. The single transceiver 14 is communicatively coupled to the integrated protocol layer 12, while the integrated protocol layer 12 is communicatively coupled to the interference-reducing mechanism 16; in other words, the interference-reducing mechanism 16 may communicate with the single transceiver 14 through the integrated protocol layer 12. As a result, packets compliant to the protocols supported by the integrated protocol layer 12 are transmitted and received via the single transceiver 14, while interference occurred during transmission of the supported protocols can be reduced via the interference-reducing mechanism 16.

In accordance with the present invention, the integrated protocol layer 12 may support two or more different communication protocols. In a preferred embodiment of the present invention, the integrated protocol layer 12 may support Bluetooth and Wireless local area network (WLAN) transmissions, both transmissions operating in the unlicensed ISM band at 2.4 GHz. More specifically, the integrated protocol layer 12 may include Bluetooth baseband layer and IEEE802.1 MAC layer so as to facilitate packet transmission in the respective protocol. Bluetooth baseband layer of the integrated protocol layer 12 may handle two link modes, namely SCO (Synchronous Connection-Oriented) and ACL (Asynchronous Connection-Less) links, so as to allocate time slots of an operation time accordingly. In other words, the integrated protocol layer 12 may support packet transmissions in both synchronous and asynchronous links to coexist with a WLAN transmission. In one embodiment of the present invention, when the WLAN transmission of the wireless communication device 10 is active, the integrated protocol layer 12 allows Bluetooth slots to be taken by WLAN so that a WLAN packet doesn't need to be fragmented to fit in Bluetooth slots. Other embodiments of the present invention with regard to the co-existence of WLAN transmission and synchronous and/or asynchronous links of Bluetooth transmission will be described in detail together with a time slot allocation scheme in accordance with the present invention later in the specification.

In accordance with the present invention, the single transceiver 14 is responsible for transmitting and receiving signals of two or more different communication protocols, such as Bluetooth and WLAN protocols. The single transceiver 14 of the present invention may be any conventional transceiver known by those skilled in the art. For example, the present invention may utilize any existing radio frequency transceiver configured for only WLAN or Bluetooth connections and reconfigure such transceiver for both WLAN and Bluetooth connections, thereby allowing of a single RF transceiver to support both WLAN and Bluetooth connections.

In a preferred embodiment, the single transceiver 14 may include a single antenna, a single signal path for WLAN and Bluetooth transmissions, a single baseband firmware, or a single driver software such that WLAN and Bluetooth protocols run through the single transceiver 14 simultaneously from a user's perspective. Furthermore, the single signal path for WLAN and Bluetooth transmissions may include single receive signal path, single transmit signal path, single VCO (voltage controlled oscillator), single PLL (phase lock loop), single frequency synthesizer, single PA Bias, single RF low pass filter, and single RF/baseband interface. While the single receive signal path may include single A/D converter, single LNA, single Rx amplifier, single Rx gain control, and single RSSI (Receive Signal Strength Indication), the single transmit signal path may include only single D/A converter, single Tx power amplifier, and single Tx VGA gain control. The single baseband firmware may implement baseband layers of WLAN and Bluetooth protocols on a single DSP (digital signal processor) chip and switch between WLAN and Bluetooth protocols based on a TDM (time-division-multiplexing) scheme, as described in detail below.

In a preferred embodiment of the present invention, switching between WLAN and Bluetooth links is done seamlessly without terminating the two said links. For example, when the switching is from WLAN to Bluetooth, signals may be sent to the integrated protocol layer 12 to pause any WLAN related operation, and information necessary for restoring the operation after switching back to WLAN may be saved; alternatively, a packet may be sent to prevent an external device 20, such as an access point (AP), from sending packet to the wireless communication device 10 during the time when the wireless communication device 10 is acting as a Bluetooth device. On the other hand, when the switching is from Bluetooth to WLAN, signals may be sent to the integrated protocol layer 12 to pause any Bluetooth related operation, and information necessary for restoring the operation after switching back to Bluetooth may be saved; alternatively, a packet may be sent to prevent the external device 20, such as the paired device in the Bluetooth connection, from sending packets to the wireless communication device 10 during the time when the wireless communication device 10 is acting as a WLAN device.

As stated above, one of the ways to provide multiple communication protocols with the single transceiver 14 is through the TDM scheme, where only one communication protocol is working on the single transceiver 14 at any given time instance. The TDM scheme accounts for different ways to distribute an operation time of the wireless communication device 10 on performing operations for multiple communication protocols, such as WLAN and Bluetooth. Different time slot sharing schemes can further be utilized under the TDM scheme so as to ensure seamless switching among the multiple communication protocols. By utilizing these time slot sharing schemes, although only one communication protocol is working on the single transceiver 14 at any given time instance, a user would not feel any interruption due to the seamless switching and could thus be using a device with multiple communication protocols at the same time from a user's perspective. These time slot sharing schemes may include but not limited to a fixed time slot sharing scheme, a flexible time slot sharing scheme, an on-demand time sharing scheme, a preemption based time sharing scheme and a mixed time sharing scheme, each described in detail as below.

In a fixed-length time slot sharing scheme, the operation time of the wireless communication device 10 may be divided into time slots of fixed length. In one embodiment of the present invention utilizing the fixed-length time slot sharing scheme, the length of the time slot may be decided by the actual application of the wireless communication device 10. WLAN and Bluetooth operations may each take one or multiple slots at a time to transmit or receive. The single transceiver 14 of the present invention is switched to act as a WLAN transceiver or a Bluetooth transceiver at the edge of a time slot. For instance, if the wireless communication device 10 is used for voice applications, the operation time may be divided into fixed time slots of 1.25 ms, which is synchronized with the sampling rate of the voice codec. The number of time slots used by the wireless communication device 10 to perform WLAN and Bluetooth operations may thus be WLAN takes two slots in every three slots.

In a flexible-length time slot sharing scheme, the operation time of the wireless communication device 10 may be divided into time slots with flexible length. WLAN and Bluetooth operations may each take one or multiple slots at a time to transmit or receive. The single transceiver 14 of the present invention may not switch between WLAN and Bluetooth at the edge of a time slot. In one embodiment of the present invention adopting the flexible-length time slot sharing scheme, the length of the time slot can be decided by the real-time performance requirement of the wireless communication device 10. For instance, if the wireless communication device 10 is operating under a scenario that the WLAN performance is more critical than Bluetooth performance, the length of the time slot when the wireless communication device 10 is performing WLAN operations can be dynamically enlarged to long enough for sustaining the WLAN performance requirement. Once the wireless communication device 10 believes that the WLAN performance requirement is met in the middle of a time slot, the single transceiver 14 can switch to perform Bluetooth operations without waiting for the edge of the time slot.

In an on-demand time sharing scheme, the operation time of the wireless communication device 10 may be competed between the WLAN and Bluetooth operations. WLAN and Bluetooth may perform their operation when they win over each other in the competition and gain control of the single transceiver 14 until the desired operation is completed. The decision of role of the single transceiver 14 of the present invention may be based on any criteria or metric suitable for the actual application of the wireless communication device 10. For instance, if the operation time is used as the criteria to decide the role of the single transceiver 14 of the present invention between WLAN and Bluetooth, the single transceiver 14 might switch to perform Bluetooth operation when the time it used to perform WLAN operation exceeds a certain threshold.

In a preemption based time sharing scheme, the operation time of the communication device 10 may be competed between the WLAN and Bluetooth operations. Each operation or groups of operations of WLAN and Bluetooth may be assigned with different levels of priority or rank. The single transceiver 14 of the present invention may perform WLAN operation as long as no Bluetooth operation with higher priority or rank than the WLAN operation needs to be performed. The role of the single transceiver 14 of the present invention will preempt the current operation of the wireless communication device 10 and the new operation will be performed till the next preemption happens. For instance, if a user starts to use Bluetooth link for real-time application while using the WLAN link for asynchronous application, the single transceiver 14 may interrupt the on-going WLAN transmission and switch to perform Bluetooth operation.

In a mixed time sharing scheme, any combination of flexible length time slot, fixed length time slot, on-demand, and preemption based time sharing schemes may be utilized. As a result, the single transceiver 14 in accordance with the present invention may achieve to perform the functions of identifying other Bluetooth and WLAN devices, connecting and transferring of respective packets.

Additionally, time slots can also be assigned dynamically using an adaptive frequency hopping scheme or other method those skilled in the art can contemplate or develop.

To further ensure the transmit of a packet can be finished within the assigned time slot, when the time to transmit the packet plus any additional time related to the transmission is too large to fit in the remaining time in the assigned time slot, one or multiple of but not limited to the following methods may be used to ensure the transmit will be completed within the remaining time of the time slot: 1) drop the packet, 2) hold back the packet to be transmitted at the beginning of the next time slot, 3) raise the transmission rate of the packet so that less time is needed for the transmission, 4) allocate more time slots for the transmit, or 5) enlarge the current time slot to fit in the packet.

On the other hand, to ensure the receive of the packet can be finished within the assigned time slot, when a packet is being received, the packet length can be known before the whole packet is received. When the time to receive the packet plus any additional time related to the receiving is too large to fit in the remaining time in the assigned time slot, one or multiple of but not limited to the following methods may be used to ensure the receive will be completed within the remaining time of the time slot: 1) drop the packet, 2) allocate more time slots for the receive, or 3) enlarge the current time slot to fit in the packet.

Figure 3:
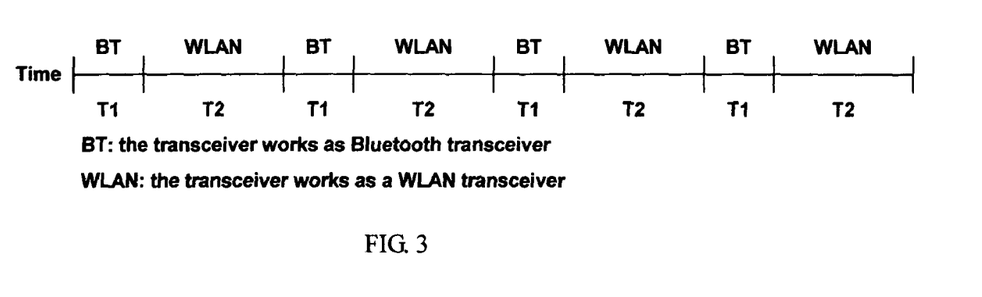
FIG. 3 is an example of a TDM scheme for WLAN and Bluetooth in accordance with the present invention.

Refer now to FIG. 3, which shows an example of TDM scheme for two communication protocols, the Wireless Local Area Network (WLAN) and the Bluetooth, working with the single transceiver 14. In FIG. 3, the single transceiver 14 works alternatively as Bluetooth for T1 seconds and as WLAN transceiver for T2 seconds. When the single transceiver 14 switches its role between Bluetooth and WLAN at a high frequency, these communication protocols will be simultaneous from the system user's point of view. In such case, multiple communication protocols share the effective bandwidth or throughput of the single transceiver 14. The Quality of Service (QoS) must be addressed to guarantee a certain level of performance for each individual communication protocol.

From the system user's point of view, the QoS is most conscious as requirements in terms of latency, data rates, and service continuous. Different applications might lean on individual QoS requirement more than the others. For example, Bluetooth can be used to support real-time speech based applications, such as Skype (IP Phone). With the SCO link defined in the Bluetooth standard, Bluetooth can support two-way real-time data traffic at the rate up to 64.0 kbits/s.

Figure 4:
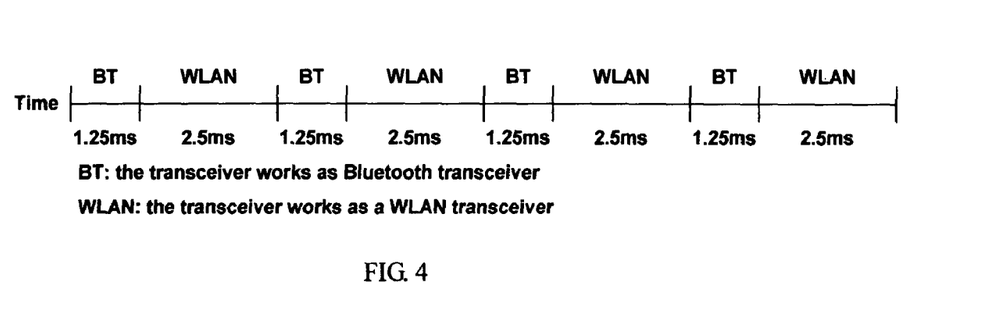
FIG. 4 is a timing scheme to provide Bluetooth SCO link and WLAN simultaneously with a single transceiver in accordance with the present invention.

Refer to FIG. 4, which shows a timing scheme to provide Bluetooth SCO link and WLAN simultaneously with the single transceiver 14 in accordance with the present invention. In FIG. 4, Bluetooth divides its operation time into 625 us time slots, which always appear in a pair of total 1.25 ms for the basic Bluetooth TX/RX operation pair. When using a packet size of 10 bytes (HV1 packet), the 64.0 kbits/s data rate is guaranteed by performing one Bluetooth TX/RX operation pair every 3.75 ms. Hence, the most intuitive way to provide the Bluetooth SCO link and WLAN simultaneously with the single transceiver 14 is dividing the operation time into 3.75 ms time slots, where the Bluetooth takes 1.25 ms from each time slot and the WLAN takes the rest, as shown in FIG. 4.

Figure 5:
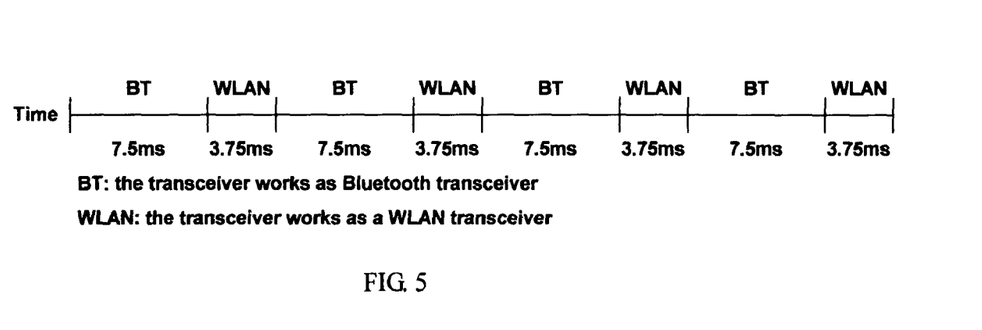
FIG. 5 is a timing scheme to provide Bluetooth ACL link and WLAN simultaneously with a single transceiver in accordance with the present invention.

Refer to FIG. 5, which shows a timing scheme to provide Bluetooth ACL link and WLAN simultaneously with the single transceiver 14 in accordance with the present invention. In FIG. 5, Bluetooth can also be used to transfer data files between computers with Asynchronous Connection-Oriented (ACL) link, which uses large packet size up to 339 bytes and supports data rate up to 433.9 kbits/s. To maximize the performance of ACL link when providing Bluetooth and WLAN with the single transceiver 14, the operation time can be divided into 11.25 ms time slots, where Bluetooth takes 7.5 ms from each time slot and the WLAN takes the rest, as shown in FIG. 5.

It is obviously that the two schemes in FIG. 4 and FIG. 5 can be switched dynamically based on the application so that both Bluetooth SCO and ACL links can be supported with WLAN on the single transceiver 14.

Figure 6:
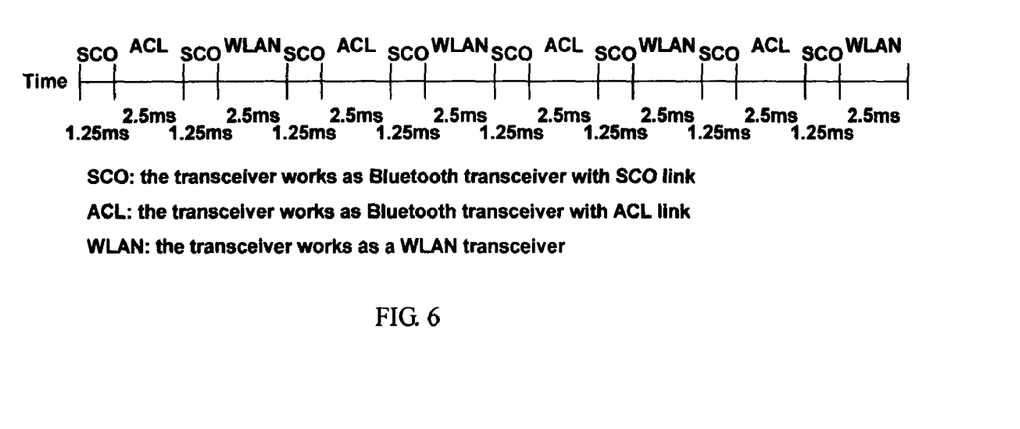
FIG. 6 is a timing scheme to provide Bluetooth SCO link, ACL link, and WLAN simultaneously with a single transceiver in accordance with the present invention.

Furthermore, Bluetooth SCO link, ACL link, and WLAN can be supported simultaneously by combining the schemes from FIG. 3 and FIG. 4. One way to combine is to compromise some performance of the ACL link. FIG. 6 shows one such scheme where for each 7.5 ms, the Bluetooth takes 5 ms and WLAN takes 2.5 ms.

Refer to FIG. 6, which shows a timing scheme to provide Bluetooth SCO link, ACL link, and WLAN simultaneously with the single transceiver 14 in accordance with the present invention. In FIG. 6, the packet size of the Bluetooth ACL link is reduced to maximum 27 bytes (DM1/DH1 packet) with data rate up to 172.8 kbits/s.

There are more TDM schemes that can be designed to satisfy requirements from different applications as well as different communication protocols. The following shows some examples of TDM scheme for providing WLAN and Bluetooth with the single transceiver 14:

The "device," such as wireless communication device 10, in the following refers to the device providing WLAN and Bluetooth simultaneously with the single transceiver 14.

Bluetooth idle scheme (T1=6.25 ms, T2=56.25 ms): the device 10 has no Bluetooth connection but stay idle while waiting for any incoming connection.

Bluetooth SCO only scheme (T1=1.25 ms, T2=2.5 ms): only one Bluetooth SCO link exists in the device 10.

Bluetooth SCO/ACL mixed scheme (T1=5.0 ms, T2=2.5 ms): one Bluetooth SCO link and at least one ACL link exists in the device 10.

Bluetooth ACL only scheme (T1=7.5 ms, T2=3.75 ms): only one Bluetooth ACL link exists in the device 10.

Bluetooth ACL mixed scheme (T1=18.75 ms, T2=3.75 ms): at least two ACL links exist in the device 10 and no SCO link is presented.

Note that the above schemes do not include all the possibilities (e.g., TDM schemes can also be designed for Bluetooth eSCO traffic) for providing WLAN and Bluetooth with the single transceiver 14. The value of T1 and T2 can be decided at run-time based on real-time requirements of the application as long as the Bluetooth operations align at the 625 us time slot boundaries.

In accordance with the present invention, a user interface (not shown) may be used to configure the single transceiver 14 to work with Bluetooth or WLAN or a combination thereof. In a preferred embodiment of the present invention, the single transceiver 14 is configured through the user interface (not shown) so as to perform the functions of identifying other Bluetooth and WLAN devices, connecting and transferring of respective packets. Additionally, configuration methods may include any one or combination of the aforementioned time-division-multiplexing (TDM) schemes.

The interference-reducing mechanism 16 of the present invention is responsible for reducing the interference generated from the transmission of the two different communication protocols. In a preferred embodiment, the interference-reducing mechanism 16 allows reduction of interference caused by the Bluetooth and WLAN transmissions. In one embodiment of the present invention, the interference-reducing mechanism 16 may be a firmware embedded in the single transceiver 14. In another embodiment of the present invention, the interference-reducing mechanism 16 may be a hardware installed within the wireless communication device 10. However, the interference-reducing mechanism 16 of the present invention can also be implemented as a software solution or a combination of the above-mentioned solutions those skilled in the art may contemplate of.

As seen in FIG. 1, in one embodiment of the present invention, the interference-reducing mechanism 16 may reduce the interference by transmitting a packet to the external device 20 preventing the external device 20 from transmitting packets in a communication protocol that is not currently active in the wireless communication device 10 to the wireless communication device 10. As mentioned before, in the case where the wireless communication device 10 is acting as a Bluetooth device, the interference-reducing mechanism 16 may transmit a packet to an access point, namely the external device 20, to let the WLAN believe that the air is busy for the time duration in the next Bluetooth time slot. This may avoid unnecessary interference between the wireless communication device 10 of the present invention and other WLAN devices. This may also allow the wireless communication device 10 of the present invention to avoid missing incoming packets from the WLAN access point, which would otherwise commence a rate dropping procedure to result in an undesired lower rate for incoming packets after switching back to the WLAN time slot. In the case where the wireless communication device 10 is acting as a WLAN device, the interference-reducing mechanism 16 packets may send a packet to prevent the external device 20, such as the paired device in the Bluetooth connection, from sending packets to the wireless communication device 10 during the time when the wireless communication device 10 is acting as the WLAN device.

Furthermore, the interference-reducing mechanism 16 may prevent transmission in one communication protocol when the wireless communication device 10 is in certain mode of the other communication protocol. For instance, when the Bluetooth link of the wireless communication device 10 of the present invention is in asynchronous mode, the interference-reducing mechanism 16 may allow the WLAN to stay in sleep mode during the Bluetooth time slot so that the WLAN will not have incoming packets from the access point during that time. When it is time for the WLAN to wake up, the interference-reducing mechanism 16 may allow the WLAN time slot to be switched back.

Figure 7:
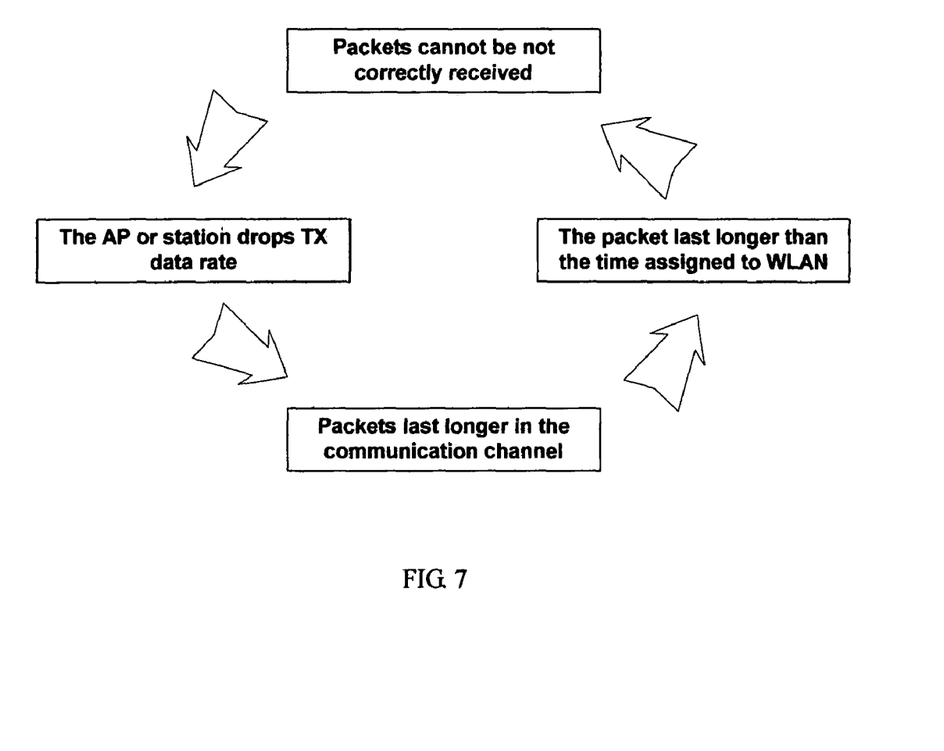
FIG. 7 illustrates a negative feedback loop of WLAN performance.

Refer now to FIG. 7, which illustrates a negative feedback loop of WLAN performance. Comparing to the Bluetooth, the WLAN communication protocol does not require fixed time slots. The WLAN TX/RX operations are performed randomly in a collision-avoidance fashion, i.e., a WLAN device transmits only when there is no other WLAN traffic in the same communication channel. The data rate of WLAN varies from 1 to 54 Mbits/s and hence the WLAN packets may last from tens of microseconds to tens of milliseconds.

The most common working environment of WLAN includes an Access Point (AP) and one or more stations as mentioned in the previous examples. The stations do not communicate with each other directly but have to communicate through the AP. The AP will always attempt to communicate with the stations with the highest possible data rate that can be sustained in the communication channel. When the channel condition is bad, which means the percentage of the WLAN packets being successfully TX/RX in a given period is less than the acceptable level, the AP or the station will drop its TX data rate to gain better receive sensitivity on the RX side. One of the side effects of the TX data rate dropping is that the packet will last longer in the communication channel. However, due to the limitation of Bluetooth, we have to assign fixed time slot to WLAN when providing Bluetooth and WLAN simultaneously with the single transceiver 14. Hence, WLAN packets may last longer than the time assigned to WLAN on the single transceiver 14. When this situation happens, it will generate a negative feedback loop for WLAN performance as illustrated in FIG. 7.

There are two major sources of the negative feedback loop: 1) the bad channel condition caused by interference or noise, and 2) the WLAN packets cannot be received during the time assigned to Bluetooth.

To overcome the first source of the negative feedback loop, the time assigned to the WLAN has to be enlarged to fit in the TX/RX of WLAN packet in attempt to break the negative feedback loop. This practice will inevitably damage the performance of Bluetooth and hence cannot be performed very frequently. One of the ways to tradeoff the performance between WLAN and Bluetooth is to use the interference-reducing mechanism 16 in accordance with the present invention, which allows the wireless communication device 10 to collect one token for the WLAN whenever the single transceiver 14 performs Bluetooth operations. After the wireless communication device 10 got enough tokens, the interference-reducing mechanism 16 allows one attempt for the WLAN to break the negative feedback loop through enlarging the time assigned to the WLAN on the single transceiver 14. If AP or station believes that WLAN packets being successfully TX/RX has got back to an acceptable level, it will raise the TX rate. In other words, the interference-reducing mechanism 16 of the present invention reduces interference that would otherwise occur between Bluetooth and WLAN transmissions by flexibly enlarging the time slot assigned to the WLAN transmission such that the wireless communication device 10 can continue acting as a WLAN device for the time slot enlarged.

To overcome the second source of the negative feedback loop, the AP should not send WLAN packet to the device 10 when the single transceiver 14 is performing Bluetooth operations. One of the ways to disallow AP to send WLAN packet is for the interference-reducing mechanism 16 of the present invention to broadcast a Clear-To-Send (CTS) packet whenever the device 10 is going to perform Bluetooth operations. The CTS packet will tell all the WLAN devices including the AP within the reception range to be silence for a particular duration, which covers the time for Bluetooth operations. In this way, the CTS packet not only prevents the AP from sending packet to the device 10 but also protects the Bluetooth operations from the interference of WLAN traffic. In other words, the interference-reducing mechanism 16 of the present invention reduces interference that would otherwise occur between Bluetooth and WLAN transmissions by sending a packet which indicates to all WLAN devices not to transmit for a particular time frame such that the wireless communication device 10 can continue acting as a Bluetooth device for such time frame.

The above methodologies may also apply for Bluetooth and other communication protocols sharing the operation time of the single transceiver 14.

As the conclusion, multiple communication protocols can be provided on the single transceiver 14 through time-division-multiplexing schemes. The Quality of Service of individual communication protocol can be guaranteed by the interference-reducing mechanism 16 such as dynamic switching between TDM schemes, on-demand adjustment of the operation time, and silencing other communication protocols when one communication protocol is running on the single transceiver 14.

In a preferred embodiment, whenever possible, the wireless communication device 10 may try to choose a WLAN access point that will have the least interference with the device 10. The ways to do so may include but are not limited to the following:

1) if WLAN access points with 5 GHz channels are available, the wireless communication device 10 may try to get connected to those access points;

2) choose the access point that is at the best distance from the wireless communication device 10. When the access point is too far away, signal may be weak, bit rate may end up lower and packets may end up longer. When the access point is too near, interference with the Bluetooth signal may be higher;

3) choose the access point with lighter traffic. The main benefit from this method may be that when the wireless communication device 10 is switched to the Bluetooth time slot, the chance that the packets come in from the access point may be lower, and the chance they are missed may be lower, and therefore the chance the bit rate from the access point to the wireless communication device 10 is dropped may be lower. Keeping the bit rate reasonably high may make the received packets fit in time slots easier;

4) check the traffic patterns of the active access points, and singles out one or more so that the adaptation in the Bluetooth adaptive frequency hopping may gain more on performance when the wireless communication device 10 is connected to this or these access points than if it is connected to any others, under the assumption that the WLAN/Bluetooth role switching is active;

5) choose access points that don't have devices that are able to run only IEEE802.11b protocol in the BSS, which means those access points are for BSS's that use only the IEEE802.11g ERP protocol. This allows the lowest bit rate to be 6 Mbps, which is higher than the 1 Mbps in the IEEE802.11b protocol, and may allow better performance for the device 10; and 6) if PCF (Point Coordination Function) access points are available, try to connect to them instead of DCF (Distributed Coordination Function) access points. In this way, the wireless communication device 10 may be able to control the timing between active and sleep mode more precisely and predicatively for the role switching between WLAN and Bluetooth.

In another embodiment of the present invention, the interference-reducing mechanism 16 may control the rate and length of the WLAN packets to be transmitted in a way that they fit in the time slots in the best way. This may be done in the MAC layer of the WLAN protocol stack. When the transmit traffic in the WLAN link is light, the rate and length of the WLAN packets may be adjusted to make the transmit short enough so that more Bluetooth time slots may be switched to. When the WLAN transmit traffic is heavy, the rate and length of the WLAN packets may be adjusted to make transmit more reliable but take multiple WLAN and BT time slots. The performance of both Bluetooth and WLAN links has to stay at a satisfactory level when the adjustments happen.

Additionally, the interference-reducing mechanism 16 may separate signals of the two communication protocols so as to extract signals in one particular protocol. For example, the wireless communication device 10 of the present invention may separate Bluetooth and WLAN signal when they are transmitted at the same time in the same frequency range. This may be done in different ways for different signal strength combinations. For instance, when WLAN signal level is low enough comparing to the Bluetooth signal, the interference-reducing mechanism 16 may perform simple filtering to extract the Bluetooth signal. Alternatively, when the WLAN signal is high enough, WLAN signal may be decoded first, and the Bluetooth signal may be obtained by subtracting the decoded WLAN signal from the received signal.

In another embodiment of the present invention, the interference-reducing mechanism 16 may control the transmit power to reduce the interference. For example, the interference-reducing mechanism 16 of the present invention may control the Bluetooth transmit power to reduce the interference between Bluetooth and WLAN links. Specifically, the necessary transmit power is first estimated for each link by the interference-reducing mechanism 16 after the link is established. Then, the transmit power may be controlled by the interference-reducing mechanism 16 at the level that is barely high enough to allow the single transceiver 14 to receive the signal correctly. One of the ways to estimate the needed transmit power may be by checking the received signal level. Since the interference at the single transceiver 14 are not necessarily the same, the transmit power is not necessarily solely derived from the received signal level to the wireless communication device 10 from the target receiver. Therefore, a try-and-fail approach, for instance, may be used to find out the power needed for transmission.

The interference-reducing mechanism 16 of the present invention may improve transmission of the two communication protocols based on an identification in an operation time. Specifically, the interference-reducing mechanism 16 of the present invention may check for a traffic ID in the WLAN and/or the Bluetooth links, determine whether packets in the transmission is targeted to the wireless communication device 10, and then drop the packets that are deemed to target communication devices other than the wireless communication device 10, thereby allowing the single transceiver 14 to get more operation time to dispense on the targeted transmission.

In accordance with the present invention, the wireless communication device 10 may further include a driver (not shown). The driver may allow the wireless communication device 10 to be recognized as either a first communication protocol device, such as a Bluetooth device, or a second communication protocol device, such as a WLAN device, or a multi-functional device for combined first and second communication protocols, such as a combined Bluetooth and WLAN device. As a result, when either of the communication protocols is active, the driver may allow the wireless communication device 10 to act accordingly.

In accordance with the present invention, at least two kinds of time slot calibrations may be needed for the wireless communication device 10: 1) time slot edge calibration and 2) synchronization calibration. The time slot edge calibration (not shown) secures the length of time allocated for WLAN and Bluetooth time slots. The synchronization calibration (not shown) may be needed for Bluetooth operations to synchronize the frequency hopping and timing between the paired devices. Multiple timers may be needed to perform time slot calibration. For example, a local timer may be used to record the time spent in the WLAN time slot and Bluetooth time slot, while a global timer may be used to calibrate any possible drifting of the time slot edge. On the other hand, the global timer may also be needed for synchronization calibration to keep tracking the pace of frequency hopping of the Bluetooth devices.

In accordance with the present invention, an additional synchronization mechanism (not shown) is performed in accordance with the above-mentioned assignment of the operation time to an external device, such as external device 20, attempting to communicate with said wireless communication device 10. More specifically, the synchronization mechanism may provide a wait signal such as the CTS_SELF packet signal available in IEEE802.11a/b/g WLAN devices. When other devices attempt to communicate with the wireless communication device 10 in accordance with the present invention while the wireless communication device 10 is 'busy' or not in the correct time share, the wait signal will indicate to the external devices, such as external device 20, the amount of time to wait before the correct time share window opens so that the external device 20 may resend such communications to the wireless communication device 10. In this case, communications with the wireless communication device 10 will occur only when the wireless communication device 10 is ready and/or capable of receiving such communications, and data will not be inadvertently lost. It should be noted that signals or methods other than the CTS_SELF packet signal known by those skilled in the art can also be used to synchronize the external device 20 with the wireless communication device 10 either dynamically or statically.

Figure 2:
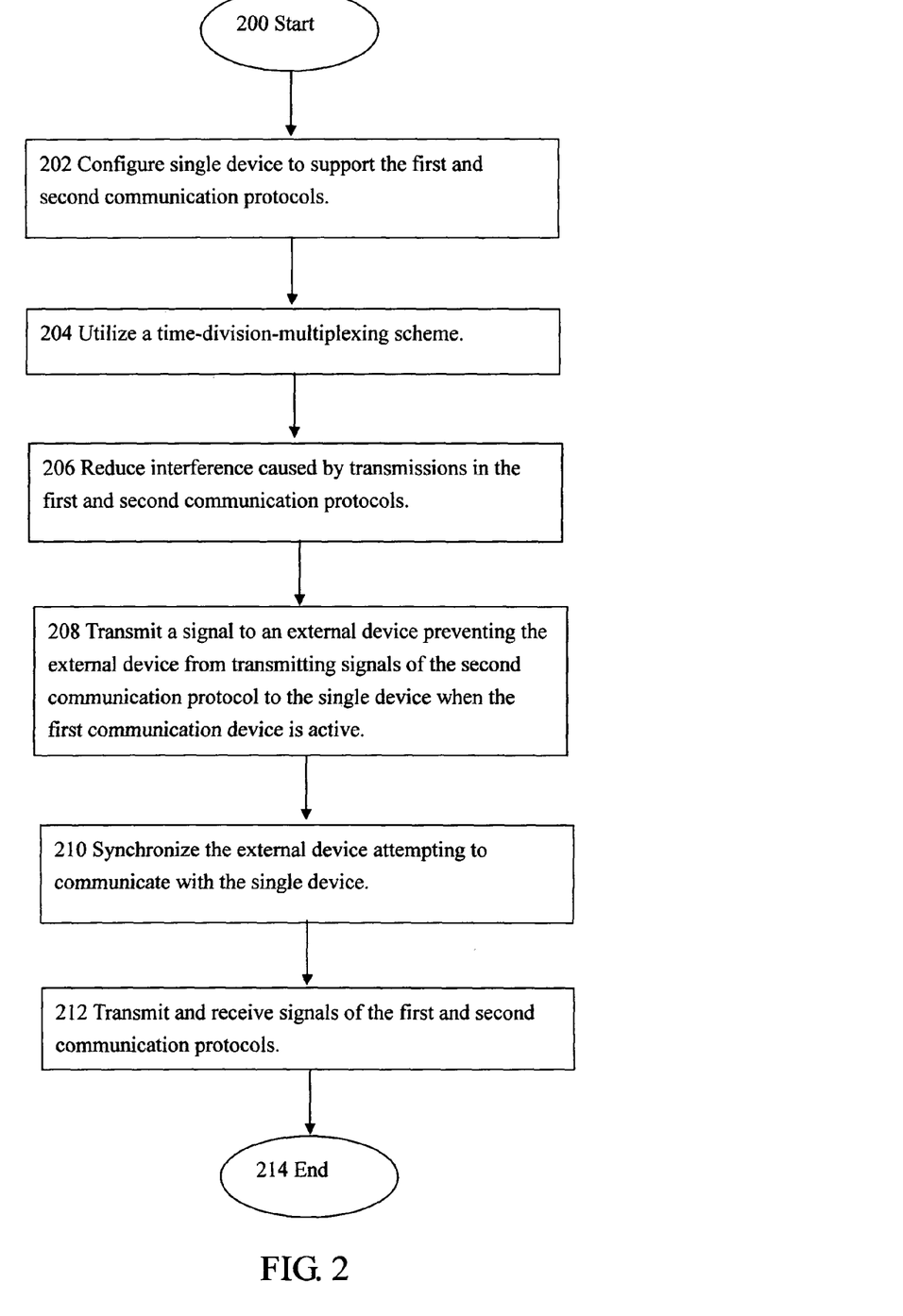
FIG. 2 is a flow chart of a wireless communicating method in accordance with the present invention.

Refer to FIG. 2, which illustrates a flow chart of a wireless communicating method in accordance with the present invention. The wireless communicating method of the present invention may allow packets of two different communication protocols, such as Bluetooth and WLAN protocols, to be transmitted and received utilizing one single transceiver. The wireless communicating method of the present invention may be adapted in a wireless communication device 10 that may include an integrated protocol layer 12, a single transceiver 14 and an interference-reducing mechanism 16.

The method of the present invention starts at step 200. At step 202, the single transceiver 14 may be configured to support Bluetooth protocol, WLAN protocol, or a combination of Bluetooth and WLAN protocols. In a preferred embodiment of the present invention, the single transceiver 16 is configured to work with the combination of Bluetooth and WLAN protocols via a user interface (not shown)

As mentioned before, in the preferred embodiment of the present invention, switching between WLAN and Bluetooth links is done seamlessly without terminating the two said links. For example, when the switching is from WLAN to Bluetooth, signals may be sent to the integrated protocol layer 12 to pause any WLAN related operation, and information necessary for restoring the operation after switching back to WLAN may be saved; alternatively, a packet may be sent to prevent an external device 20, such as a access point (AP), from sending packet to the wireless communication device 10 during the time when the wireless communication device 10 is acting as a Bluetooth device. On the other hand, when the switching is from Bluetooth to WLAN, signals may be sent to the integrated protocol layer 12 to pause any Bluetooth related operation, and information necessary for restoring the operation after switching back to Bluetooth may be saved; alternatively, a packet may be sent to prevent the external device 20, such as the paired device in the Bluetooth connection, from sending packets to the wireless communication device 10 during the time when the wireless communication device 10 is acting as a WLAN device. The switching is seamless so that from a device user's perspective, both communication protocols, such as the WLAN and Bluetooth, are run simultaneously.

Then, at step 204, a time-division multiplexing scheme is utilized to support the two communication protocols. As mentioned before, the TDM scheme accounts for different ways to distribute an operation time of the wireless communication device 10 on performing operations for WLAN and Bluetooth communication links. The ways to do so may include but are not limited to a fixed time slot sharing scheme, a flexible time slot sharing scheme, an on-demand time sharing scheme, a preemption based time sharing scheme and a mixed time sharing scheme. As each time sharing scheme has already been discussed in details in the aforementioned paragraphs, these details will not be repeated hereinafter.

To further ensure the transmit of a packet can be finished within the assigned time slot, when the time to transmit the packet plus any additional time related to the transmission is too large to fit in the remaining time in the assigned time slot, one or multiple of but not limited to the following methods may be used to ensure the transmit will be completed within the remaining time of the time slot: 1) drop the packet, 2) hold back the packet to be transmitted at the beginning of the next time slot, 3) raise the transmission rate of the packet so that less time is needed for the transmission, 4) allocate more time slots for the transmit, or 5) enlarge the current time slot to fit in the packet.

On the other hand, to ensure the receive of the packet can be finished within the assigned time slot, when a packet is being received, the packet length can be known before the whole packet is received. When the time to receive the packet plus any additional time related to the receiving is too large to fit in the remaining time in the assigned time slot, one or multiple of but not limited to the following methods may be used to ensure the receive will be completed within the remaining time of the time slot: 1) drop the packet, 2) allocate more time slots for the receive, or 3) enlarge the current time slot to fit in the packet.

In order to ensure smooth transmission in both Bluetooth and WLAN protocols, the interference-reducing mechanism 16 reducing the interference occurred in Bluetooth and WLAN transmissions takes place in accordance with the wireless communication device 10 at step 206. In one embodiment of the present invention, the interference-reducing mechanism 16 reduces the interference by preventing WLAN transmission when the wireless communication device 10 is in asynchronous mode. Specifically, when the Bluetooth link of the wireless communication device 10 of the present invention is in asynchronous mode, the interference-reducing mechanism 16 may allow the WLAN to stay in sleep mode during the Bluetooth time slot so that the WLAN will not have incoming packets from the access point during that time. When it is time for the WLAN to wake up, the interference-reducing mechanism 16 may allow the WLAN time slot to be switched back. Additionally, information necessary to restore the WLAN transmission is saved.

In another embodiment of the present invention, the interference-reducing mechanism 16 may reduce the interference by separating signals of the two communication protocols so as to extract signals in one particular protocol. For example, the wireless communication device 10 of the present invention may separate Bluetooth and WLAN signal when they are transmitted at the same time in the same frequency range. This may be done in different ways for different signal strength combinations. For instance, when WLAN signal level is low enough comparing to the Bluetooth signal, the interference-reducing mechanism 16 may perform simple filtering to extract the Bluetooth signal. Alternatively, when the WLAN signal is high enough, WLAN signal may be decoded first, and the Bluetooth signal may be obtained by subtracting the decoded WLAN signal from the received signal.

In yet another embodiment of the present invention, the interference-reducing mechanism 16 may reduce interference by controlling the transmit power of the single transceiver 14. For example, the interference-reducing mechanism 16 of the present invention may control the Bluetooth transmit power to reduce the interference between Bluetooth and WLAN links. Specifically, the necessary transmit power is first estimated for each link by the interference-reducing mechanism 16 after the link is established. Then, the transmit power may be controlled by the interference-reducing mechanism 16 at the level that is barely high enough to allow the single transceiver 14 to receive the signal correctly. One of the ways to estimate the needed transmit power may be by checking the received signal level. Since the interference at the single transceiver 14 are not necessarily the same, the transmit power is not necessarily solely derived from the received signal level to the wireless communication device 10 from the target receiver. Therefore, a try-and-fail approach, for instance, may be used.

In yet another embodiment of the present invention, the interference-reducing mechanism 16 may reduce interference by improving transmission of the two communication protocols based on an identification in an operation time. Specifically, the interference-reducing mechanism 16 of the present invention may check for a traffic ID in the WLAN and/or the Bluetooth links, determine whether packets in the transmission is targeted to the wireless communication device 10, and then drop the packets that are deemed to target communication devices other than the wireless communication device 10, thereby allowing the single transceiver 14 to get more operation time to dispense on the targeted transmission.

In yet another embodiment of the present invention, the interference-reducing mechanism 16 reduces interference that would otherwise occur between Bluetooth and WLAN transmissions by flexibly enlarging the time slot assigned to the WLAN transmission such that the wireless communication device 10 can continue acting as a WLAN device for the time slot enlarged. Enlarging the time slot assigned may be accomplished by allowing the wireless communication device 10 to collect one token for the WLAN whenever the single transceiver 14 performs Bluetooth operations. After the wireless communication device 10 got enough tokens, the interference-reducing mechanism 16 allows one attempt for the WLAN to break the negative feedback loop through enlarging the time assigned to the WLAN on the single transceiver 14. If AP or station believes that WLAN packets being successfully TX/RX has got back to an acceptable level, it will raise the TX rate.

At step 208, the interference-reducing mechanism 16 may transmit a packet to an external device 20 preventing the external device 20 from transmitting packets in a communication protocol that is not currently active in the wireless communication device 10 to the wireless communication device 10. For example, the wireless communication device 10 may transmit a packet to an access point to let the WLAN believe that the air is busy for the time duration in the next Bluetooth time slot. This may avoid unnecessary interference between the wireless communication device 10 of the present invention and other WLAN devices. This may also allow the wireless communication device 10 of the present invention to avoid missing incoming packets from the WLAN access point, which would otherwise commence a rate dropping procedure to result in an undesired lower rate for incoming packets after switching back to the WLAN time slot.

Additionally, in the preferred embodiment, whenever possible, the wireless communication device 10 may try to choose a WLAN access point that will have the least interference with the device 10. The ways to do so may include but are not limited to the following:

1) if WLAN access points with 5 GHz channels are available, the wireless communication device 10 may try to connect to those access points;

2) choose the access point that is at the best distance from the wireless communication device 10;

3) choose the access point with lighter traffic;

4) check the traffic patterns of the active access points, and singles out one or more so that the adaptation in the Bluetooth adaptive frequency hopping may gain more on performance when the wireless communication device 10 is connected to this or these access points than if it is connected to any others, under the assumption that the WLAN/Bluetooth role switching is active;

5) choose access points that don't have devices that are able to run only IEEE802.11b protocol in the BSS, which means those access points are for BSS's that use only the IEEE802.11g ERP protocol; and 6) if PCF (Point Coordination Function) access points are available, try to connect to them instead of DCF (Distributed Coordination Function) access points.

In another embodiment of the present invention, the interference-reducing mechanism 16 may control the rate and length of the WLAN packets to be transmitted in a way that they fit in the time slots in the best way. This may be done in the MAC layer of the WLAN protocol stack. When the transmit traffic in the WLAN link is light, the rate and length of the WLAN packets may be adjusted to make the transmit short enough so that more Bluetooth time slots may be switched to. When the WLAN transmit traffic is heavy, the rate and length of the WLAN packets may be adjusted to make transmit more reliable but take multiple WLAN and BT time slots. The performance of both Bluetooth and WLAN links has to stay at a satisfactory level when the adjustments happen.

Furthermore, in accordance with the present invention, at least two kinds of time slot calibrations may be needed for the wireless communication device 10: 1) time slot edge calibration and 2) synchronization calibration. The time slot edge calibration (not shown) secures the length of time allocated for WLAN and Bluetooth time slots. The synchronization calibration (not shown) is needed by Bluetooth operations to synchronize the frequency hopping and timing between the paired devices. Multiple timers may be needed to perform time slot calibration. For example, a local timer may be used to record the time spent in the WLAN time slot and Bluetooth time slot, while a global timer is used to calibrate any possible drifting of the time slot edge. On the other hand, the global timer may also be needed for synchronization calibration to keep tracking the pace of frequency hopping of the Bluetooth devices.

Then, at step 210, a synchronization mechanism (not shown) is performed in accordance with the operation time assigned in step 204 on an external device attempting to communicate with said wireless communication device. More specifically, the synchronization mechanism may provide a wait signal such as the CTS_SELF packet signal available in IEEE802.11a/b/g WLAN devices. When other devices attempt to communicate with the wireless communication device 10 in accordance with the present invention while the wireless communication device 10 is 'busy' or not in the correct time share, the wait signal will indicate to the external devices, such as external device 20, the amount of time to wait before the correct time share window opens so that the external device 20 may resend such communications to the wireless communication device 10. In this case, communications with the wireless communication device 10 will occur only when the wireless communication device 10 is ready and/or capable of receiving such communications, and data will not be inadvertently lost.

Finally, the single transceiver 14 transmits and receives packets of Bluetooth and WLAN protocols at step 212 as configured in step 202. In the preferred embodiment of the present invention, the single transceiver 14 acts as the transceiver for both Bluetooth and WLAN such that from the system user's perspective Bluetooth and WLAN communication protocols run through the single transceiver 14 simultaneously. The method of the present invention ends at 214.

Although the invention has been described in considerable detail with reference to the preferred version thereof, other versions are within the scope of the present invention. Therefore, the spirit and scope of the appended claims should not be limited to the description of the preferred version contained herein.

The invention claimed is:

1. A wireless communication device, comprising:
an integrated protocol layer supporting a first communication protocol and a second communication protocol; and
a single transceiver operative to transmit and/or receive signals of said first and said second communication protocols,
wherein said first communication protocol covers a shorter distance range than that of said second communication protocol, and wherein said first communication protocol includes a first mode and a second mode, each of said first and second modes of said first communication protocol can coexist with said second communication protocol.

2. The wireless communication device of claim 1, further comprising an interference-reducing mechanism operative to reduce an interference occurred between said first and second communication protocols, wherein said interference-reducing mechanism allows said single transceiver to support both said first and said second communication protocols.

3. The wireless communication device of claim 2, wherein said interference-reducing mechanism allows said single transceiver to support both said first and said second communication protocols based on a time-division-multiplexing scheme.

4. The wireless communication device of claim 3, wherein said time-division-multiplexing scheme allows a time slot of an operation time to be assigned to a transmission of said first or said second communication protocols.

5. The wireless communication device of claim 4, wherein said assignment of time slot is done dynamically using an adaptive frequency hopping scheme, a fixed length time slot sharing scheme, a flexible length time slot sharing scheme, a preemption based time sharing scheme, an on demand time sharing scheme or any combination thereof.

6. The wireless communication device of claim 4, wherein one or any combination of the following methods may be used to ensure a transmit packet of said first or second communication protocols is completed within said time slot: 1) drop said packet, 2) hold back said packet to be transmitted at the beginning of a next time slot, 3) raise a transmission rate of said packet, 4) assign multiple time slots for said packet, or 5) enlarge said time slot to fit in said packet.

7. The wireless communication device of claim 6, wherein said method of enlarging said time slot to fit in said packet can be accomplished by obtaining a token for said second communication protocol each time an operation of said first communication protocol is performed such that when a predetermined number of said token is reached, said method of enlarging said time slot to fit in said packet is performed.

8. The wireless communication device of claim 6, wherein said interference-reducing mechanism controls said transmission rate and a length of said packet to be transmitted to best fit said time slot.

9. The wireless communication device of claim 4, wherein one or any combination of the following methods may be used to ensure a receive packet of said first or second communication protocols is completed within said time slot: 1) drop said packet, 2) assign multiple time slots for said packet, or 3) enlarge said time slot to fit in said packet.

10. The wireless communication device of claim 9, wherein said method of enlarging said time slot to fit in said packet can be accomplished by obtaining a token for said second communication protocol each time an operation of said first communication protocol is performed such that when a predetermined number of said token is reached, said method of enlarging said time slot to fit in said packet is performed.

11. The wireless communication device of claim 4, wherein said interference-reducing mechanism improves said transmission of said first or said second communication protocols based on an identification in said operation time.

12. The wireless communication device of claim 4, wherein a synchronization mechanism is performed in accordance with said assignment of time slot on an external device attempting to communicate with said wireless communication device.

13. The wireless communication device of claim 12, wherein said synchronization mechanism is performed dynamically using a CTS_SELF packet signal or other signal or methods.

14. The wireless communication device of claim 2, wherein when said wireless communication device is active in one of said first and second communication protocols, said interference-reducing mechanism is operative to transmit a signal to an external device preventing said external device from transmitting signals of other one of said first and second communication protocols to said wireless communication device.

15. The wireless communication device of claim 14, wherein said interference-reducing mechanism further saves information necessary to restore transmission of said the other one of said first and second communication protocols.

16. The wireless communication device of claim 2, wherein when said wireless communication device is in said first or said second mode of said first communication protocol, said interference-reducing mechanism is operative to prevent a transmission of said second communication protocol without terminating said transmission of said second communication protocol.

17. The wireless communication device of claim 2, wherein said interference-reducing mechanism extracts signals of said first communication protocol from signals of said first and said second communication protocols.

18. The wireless communication device of claim 2, wherein said interference-reducing mechanism controls a transmit power of said single transceiver.

19. The wireless communication device of claim 2, wherein said interference-reducing mechanism chooses an access point for said second communication protocol by one or a combination of the following ways: 1) choosing an access point with a 5 GHz channel available; 2) choosing an access point at a preferred distance; 3) choosing an access point with a lighter traffic; 4) choosing an access point with a preferred traffic pattern; 5) choosing an access point not using only IEEE802.11g ERP protocol; and 6) choosing an access point with point coordination function.

20. A single transceiver embedded with an interference-reducing mechanism of claim 2.

21. The wireless communication device of claim 1, wherein said first mode is a Synchronous Connection-Oriented (SCO) link mode, and said second mode is an Asynchronous Connection-Less (ACL) link mode.

22. The wireless communication device of claim 1, further comprising a user interface to configure said single transceiver to work with said first communication protocol, or said second communication protocol or a combination thereof.

23. The wireless communication device of claim 1, wherein said first communication protocol is a Bluetooth communication protocol and said second communication protocol is a wireless local area network communication protocol.

24. The wireless communication device of claim 1, wherein said single transceiver is a wireless local area network transceiver.

25. The wireless communication device of claim 1, wherein said single transceiver employs a single antenna, a single signal path for said first and second communication protocols, a single baseband firmware, or a single driver software.

26. The wireless communication device of claim 25, wherein said single signal path for said first and second communication protocols include single receive signal path, single transmit signal path, single VCO (voltage controlled oscillator), single PLL (phase lock loop), single frequency synthesizer, single PA Bias, single RF low pass filter, and single RF/baseband interface.

27. The wireless communication device of claim 26, wherein said single receive signal path includes single A/D converter, single LNA, single Rx amplifier, single Rx gain control, and single RSSI (Receive Signal Strength Indication).

28. The wireless communication device of claim 26, wherein said single transmit signal path includes single D/A converter, single Tx power amplifier, and single Tx VGA gain control.

29. The wireless communication device of claim 25, wherein said single baseband firmware may implement a baseband layer of said first and second communication protocols on a single DSP (digital signal processor) chip and switch between said first and second communication protocols based on a TDM (time-division-multiplexing) scheme.

30. The wireless communication device of claim 29, wherein said switching between said first and second communication protocols on said single DSP chip may be performed seamlessly without terminating a link in said first or second communication protocol.

31. The wireless communication device of claim 29, wherein said TDM scheme may allocate a fixed or flexible length time slot for said first and second communication link in an on-demand or preemption manner.

32. The wireless communication device of claim 1, wherein said first and second communication protocols are switched seamlessly on said single transceiver from a user's perspective.

33. The wireless communication device of claim 1, wherein said device further comprises a driver allowing said device to be recognized as either a first communication protocol device or a second communication protocol device or a multi-functional device for combined first and second communication protocols.

34. The wireless communication device of claim 1, further comprising a calibration mechanism so as to secure a time slot allocation for said first and said second communication protocols.

35. The wireless communication device of claim 34, wherein said calibration mechanism can further synchronize between paired devices of one of said first and said second communication protocols.

36. A wireless communication device, comprising:
an integrated protocol layer supporting a first communication protocol and a second communication protocol; and
a single transceiver operative to transmit and/or receive signals of said first and said second communication protocols wherein a signal is sent to said integrated protocol layer to pause any operation of one of said first and second communication protocols when an operation of other one of said first and said second communication protocol is active.

37. A wireless communicating method, adapted in a single device, said method comprising:
supporting a first communication protocol and a second communication protocol in said single device; and
transmitting and receiving signals of said first and said second communication protocols;
wherein said single device employs a single transceiver for said transmitting and receiving signals of said first and said second communication protocols, and
wherein said first communication protocol covers a shorter distance range than that of said second communication protocol, and
wherein said first communication protocol includes a first mode and a second mode, each of said first and second modes of said first communication protocol can coexist with said second communication protocol.

38. The wireless communication method of claim 37, further comprising reducing interference occurred between said first and said second communication protocols in said single device.

39. The wireless communication method of claim 37, wherein a time-division-multiplexing scheme is utilized to allow said single device to support said first and said second communication protocols.

40. The wireless communicating method of claim 39, wherein said time-division-multiplexing scheme allows a time slot of an operation time to be assigned to a transmission of said first or said second communication protocols.

41. The wireless communicating method of claim 40, further comprising ensuring a transmit or receive packet of said first or second communication protocols is completed within said operation time.

42. The wireless communicating method of claim 41, further comprising enlarging a current slot to fit in said packet by obtaining a token for said second communication protocol each time an operation of said first communication protocol is performed such that when a predetermined number of said token is reached, said method of enlarging the current slot in said packet is performed.

43. The wireless communication device of claim 41, further comprising controlling a transmission rate and a length of said packet to best fit said time slots.

44. The wireless communication device of claim 40, further comprising improving said transmission of said first or said second communication protocols based on an identification in said operation time.

45. The wireless communication method of claim 37, wherein said first mode is a Synchronous Connection-Oriented (SCO) link mode, and said second mode is an Asynchronous Connection-Less (ACL) link mode.

46. The wireless communicating method of claim 37, wherein when said single device is in said first or said second mode of said first communication protocol, said method further comprises preventing a transmission of said second communication protocol without terminating said transmission of said second communication protocol.

47. The wireless communicating method of claim 37, further comprising extracting signals of said first communication protocol from signals of said first and said second communication protocols.

48. The wireless communicating method of claim 37, further comprising configuring said single device to work with said first communication protocol, or said second communication protocol or a combination thereof via a user interface.

49. The wireless communicating method of claim 37, further comprising controlling a transmit power of said single device.

50. The wireless communicating method of claim 37, further comprising assigning a time slot in one of the following schemes: dynamically using an adaptive frequency hopping scheme, a fixed length time slot sharing scheme, a flexible length time slot sharing scheme, a preemption based time sharing scheme, an on demand time sharing scheme or any combination thereof.

51. The wireless communicating method of claim 50, further comprising synchronizing an external device attempting to communicate with said single device in accordance with said assignment of time slot.

52. The wireless communication method of claim 51, wherein said synchronization is performed dynamically using a CTS_SELF packet signal or other signal or methods.

53. The wireless communication device of claim 37, further comprising calibrating a time slot so as to secure a time slot allocation for said first or said second communication protocols.

54. The wireless communication method of claim 37, further comprising choosing an access point for said second communication protocol by one or a combination of the following ways: 1) choosing an access point with 5 GHz channels available; 2) choosing an access point at a preferred distance; 3) choosing an access point with a lighter traffic; 4) choosing an access point with a preferred traffic pattern; 5) choosing an access point not using only IEEE802.11g ERP protocol; 6) choosing an access point with a point coordination function.

55. A wireless communicating method, adapted in a single device, said method comprising:
supporting a first communication protocol and a second communication protocol in said single device; and
transmitting and receiving signals of said first and said second communication protocols;
wherein said single device employs a single transceiver for said transmitting and receiving signals of said first and said second communication protocols, and
wherein when said single device is active in one of said first and said second communication protocols, transmitting a signal to an external device preventing said external device from transmitting signals of other one of said first and said second communication protocols to said single device.

56. The wireless communication method of claim 55, further comprising saving information necessary to restore transmission of said the other one of said first and second communication protocols.

57. A wireless communicating method, adapted in a single device, said method comprising:
supporting a first communication protocol and a second communication protocol in said single device; and
transmitting and receiving signals of said first and said second communication protocols;

wherein said single device employs a single transceiver for said transmitting and receiving signals of said first and said second communication protocols, and wherein sending a signal to pause any operation of one of said first and second communication protocols when an operation of other one of said first and said second communication protocol is active.

58. A single transceiver supporting a first communication protocol and a second communication protocol, wherein said first communication protocol covers a shorter distance range than that of said second communication protocol, and wherein said first communication protocol includes a first mode and a second mode, each of said first and second modes of said first communication protocol can coexist with said second communication protocol so that said first communication protocol and said second communication protocol can be switched seamlessly from a user's perspective.

59. The single transceiver of claim 58, wherein said single transceiver employs a single antenna, a single signal path for said first and second communication protocols, a single baseband firmware, or a single driver software.

60. The single transceiver of claim 59, wherein said single transceiver is a wireless local area network transceiver.

* * * * *